United States Patent [19]
Fujita et al.

[11] Patent Number: 5,851,048
[45] Date of Patent: Dec. 22, 1998

[54] WEATHER STRIP

[75] Inventors: Yasuyuki Fujita; Satoshi Inoue, both of Hiroshima, Japan

[73] Assignee: Nishikawa Rubber Co., Ltd., Hiroshima, Japan

[21] Appl. No.: 539,247

[22] Filed: Oct. 5, 1995

[30]    Foreign Application Priority Data

| Oct. 6, 1994 | [JP] | Japan | 6-270661 |
| Nov. 18, 1994 | [JP] | Japan | 6-309748 |
| Nov. 21, 1994 | [JP] | Japan | 6-312520 |

[51] Int. Cl.⁶ .................................. B60J 7/12; E06B 7/16
[52] U.S. Cl. ................... 296/107.04; 296/135; 296/93; 296/146.3; 296/146.9; 49/495.1; 49/475.1
[58] Field of Search ............................. 296/107, 93, 135, 296/146.3, 146.9, 146.14; 49/495.1, 475.1

[56]              References Cited

U.S. PATENT DOCUMENTS

| 2,686,691 | 8/1954 | Burrell | 296/107 |
| 2,759,760 | 8/1956 | Omlie | 296/107 X |
| 3,050,334 | 8/1962 | Geiger | 296/107 |
| 3,653,711 | 4/1972 | De Claire et al. | 296/107 |
| 4,529,243 | 7/1985 | Kaltz et al. | 296/107 |
| 4,653,801 | 3/1987 | Shirasu et al. | 296/93 X |
| 4,729,593 | 3/1988 | Nisiguchi et al. | 296/107 X |
| 5,100,195 | 3/1992 | Patel | 296/107 |
| 5,311,702 | 5/1994 | Moore | 296/135 X |

*Primary Examiner*—Joseph D. Pape
*Attorney, Agent, or Firm*—Flynn, Thiel, Boutell & Tanis, P.C.

[57]            ABSTRACT

A weather strip to be attached to sides of a foldable, detachable, movable roof of a vehicle, the weather strip composed of an extrusion portion and a mold portion. The extrusion portion has a base, a hollow seal, the hollow seal having an upper portion directing toward an outside of a vehicle so as to form a convex portion for contacting an upper portion of a door glass, a bridge portion provided in the hollow seal by halving hollow portion of the hollow seal vertically, the bridge portion being constricted at an inner intermediate portion thereof, and a seal lip projecting from a lower portion of the hollow seal for elastically contacting the door glass, the seal lip directing outward of the vehicle. The mold portion has the bridge portion and the seal lip which are the same as those of the extrusion portion. Accordingly, the sealing property and external appearance of the transfer portion and the mold portion can be improved. Further, one of the mold portions is detachable or movable and is guided in a detachable direction or moving direction. The mold portions have engaging portions which are engaged with and complement each other at contacting end surfaces thereof when mounted on another mold portions, and wherein the engaging portions have saw-toothed convex and concave portions so as to maintain an effective sealing repulsive force.

4 Claims, 11 Drawing Sheets

WEATHER STRIP

BACKGROUND OF THE INVENTION

1. Field of the Invention

The present invention relates to a weather strip to be attached to sides of a foldable roof of a vehicle such as a convertible car, or a detachable roof of a vehicle such as a targa top car, or a movable roof of a vehicle, particularly to structure of engaging portions of mold portions of the weather strip.

2. Prior Art

First, second and third prior art weather strips are illustrated in FIGS. 1 to 12. Employed in the same figures, denoted at ▲, i.e. a reverse isosceles triangle which is partitioned by a line extending from a vertical angle thereof wherein one half is white and the other is painted over with black. The portion painted over with black represents a mold portion and a portion which was not painted over with black represents an extrusion portion.

The first to third prior art weather strips are attached to sides of a foldable roof of a vehicle such as a convertible car, or a detachable roof of a vehicle such as a targa top car, or a movable roof of a vehicle.

Denoted at 1 are roof side weatherstrips, 2 are body side weatherstrips, 10 is a base, 20 is a hollow seal integrated with the base 10 and formed in concave directing outside the car at an upper portion so as to elastically contact an upper portion of a door glass 50, and the hollow seal 20 has a seal lip 30 protruding from a lower portion thereof for elastically contacting the door glass 50. The hollow seal 20 is divided vertically into upper and lower portions so that the upper and lower portions are not affected by each other when the hollow seal 20 elastically contacts the door glass 50. The hollow seal 20 is constricted at a middle portion to form a bridge portion 25. The bridge portion 25 can provide a draining function between the hollow seal 20 and the seal lip 30. An extrusion/mold transfer portion L which transfers from an extrusion portion K to a mold portion M (hereinafter referred to as simply transfer portion L) cuts the bridge portion 25 while the mold portion M adjoining the transfer portion L omits the bridge portion 25 so as to form a single hollow portion. The seal lip 30 is gradually shortened (lowered) as it is apart from a portion adjoining the transfer portion L and mold portion M. A core ejecting hole Z for ejecting cores which are inserted into the transfer portion L and the hollow portion of the mold portion M is defined in the base 10.

In the first and third prior art weather strips, the transfer portion L and mold portion M omit a part of the structure of the extrusion portion K so that sealing function of the transfer portion L, and mold portion M is deteriorated. To compensate the deterioration of the sealing function, there are the following drawbacks. It is necessary to employ an additional member (e.g., pad) which increases a manufacturing cost of the weather strip. Since an appearance and a sealing function of the extrusion portion K and appearances and sealing functions of the other portions are different from one another, an appearance is marred and a sealing function is lowered as a whole.

In the second prior art, since no guide means is provided at a portion confronting adjoining both extrusion and mold portion, attaching accuracy is difficult to improve.

SUMMARY OF THE INVENTION

It is an object of the present invention to overcome the aforementioned drawbacks of the prior art weather strips.

To achieve the above object, it is a first aspect of the invention to provide a weather strip to be attached to sides of a foldable, detachable, movable roof of a vehicle, the weather strip composed of an extrusion portion K and a mold portion M connected to the extrusion portion K. The extrusion portion K comprises a base 10, a hollow seal 20 integrated with the base 10, the hollow seal 20 having an upper portion 21 directing toward an outside of a vehicle so as to form a convex portion for elastically contacting an upper portion of a door glass 50, a bridge portion 25 provided in the hollow seal 20 by halving the hollow portion of the hollow seal 20 vertically, the bridge portion 25 being constricted at an inner intermediate portion thereof and directed inward and outward of the vehicle, a seal lip 30 projecting from a lower portion 22 of the hollow seal 20 for elastically contacting the door glass 50, the seal lip 30 directing outward of the vehicle. The mold portions $M_1$, $M_2$ have the bridge portions 25$a$, 25$b$ and the seal lips 30$a$, 30$b$ which are the same as those of the extrusion portion K. It is a second aspect of the invention to provide the weather strip which includes, in addition to the elements of the first aspect of the invention, cores inserted in the vertically divided upper and lower hollow portions of the hollow seal 20, wherein the cores can be ejected from both side portions of the upper and lower hollow portions of the hollow seal 20. The core inserted into the upper hollow portion of the hollow seal 20 can be ejected from a core ejecting hole H provided in the base 10, and the core inserted into the lower hollow portion of the hollow seal 20 can be ejected from a side portion of the lower hollow portion of the hollow seal 20.

A modification of the second aspect of the invention includes engaging portions M' and M' having first and second confronted surfaces 7$a$ and 7$b$, wherein the first confronted surface 7$a$ has a non-seal portion 27 on which a tapered convex portion P is formed, and the second confronted surface 7$b$ has a non-seal portion 27 on which a tapered concave portion is formed, the tapered convex portion P engaging with the tapered concave portion Q. The tapered convex portion P and the tapered concave portion Q are individually embedded in the non-seal portions 27 and made of hard synthetic resin or hard solid rubber.

It is a third aspect of the invention to provide the weather strip having the same elements as the first aspect of the invention, wherein one of the mold portions is detachable or movable and is guided in a detachable direction or moving direction, and both mold portions have engaging portions which are engaged with and complement with each other at contacting end surfaces thereof when mounted on the other mold portion, and wherein the engaging portions have saw-toothed convex and concave portions so as to maintain effective sealing repulsive force.

PREFERRED EMBODIMENT OF THE INVENTION

Figure 1:
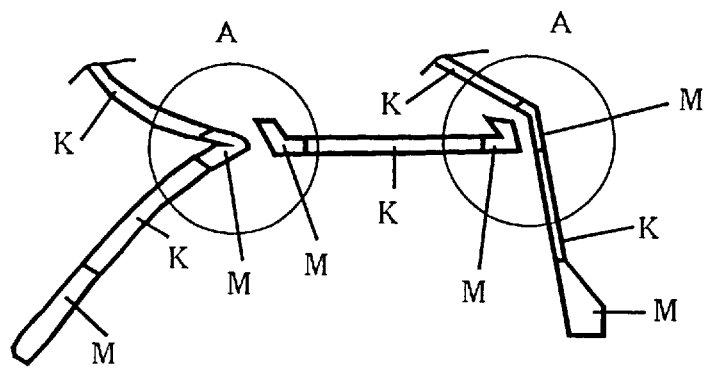
FIG. 1 is a perspective view of a weather strip for a targa top car according to a first prior art weather strip.
Figure 2:
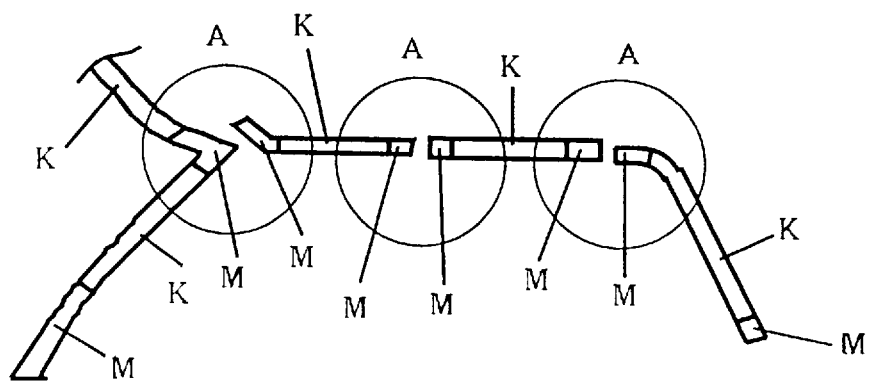
FIG. 2 is a perspective view of a weather strip for a convertible car according to the first prior art weather strip.
Figure 3:
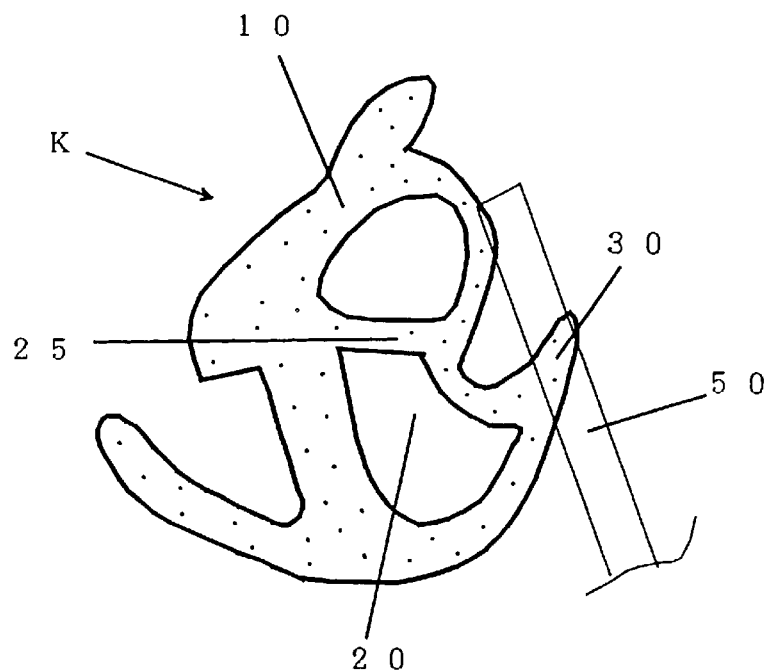
FIG. 3 is a cross-sectional view of the an extrusion portion of first prior art weather strip.
Figure 4:
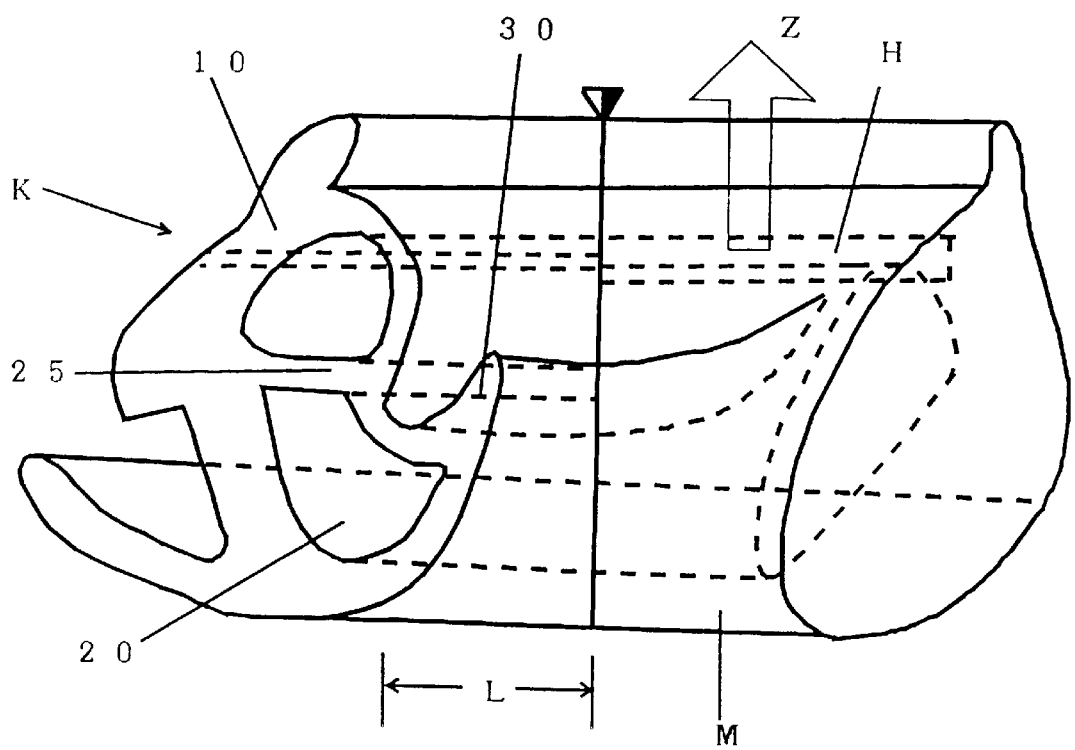
FIG. 4 is a perspective view showing a connecting portion between the extrusion portion and a mold portion denoted at circles A in FIGS. 1 and 2 according to the first prior art weather strip.
Figure 5:
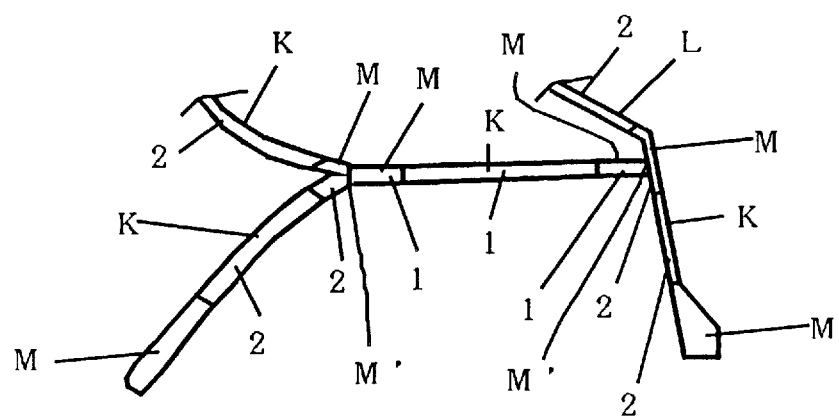
FIG. 5 is a perspective view of a weather strip for a targa top car according to a second prior art weather strip.
Figure 6:
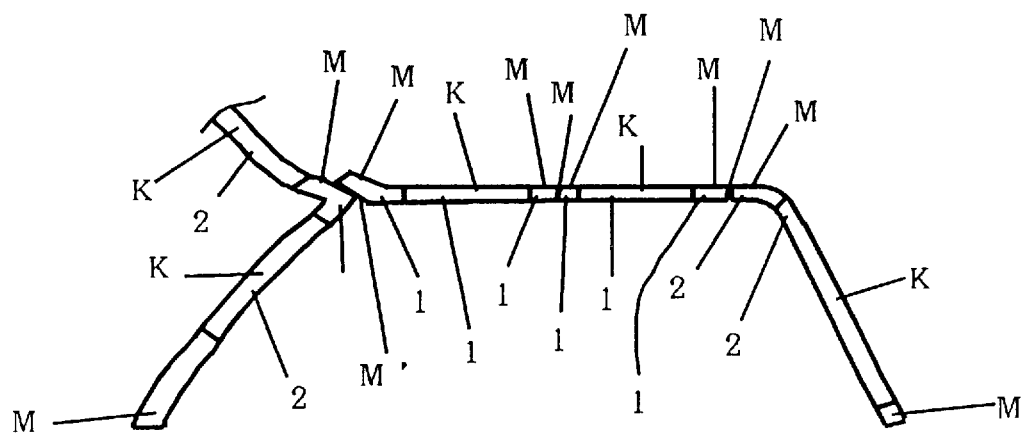
FIG. 6 is a perspective view of a weather strip for a convertible car according to the second prior art weather strip.
Figure 7:
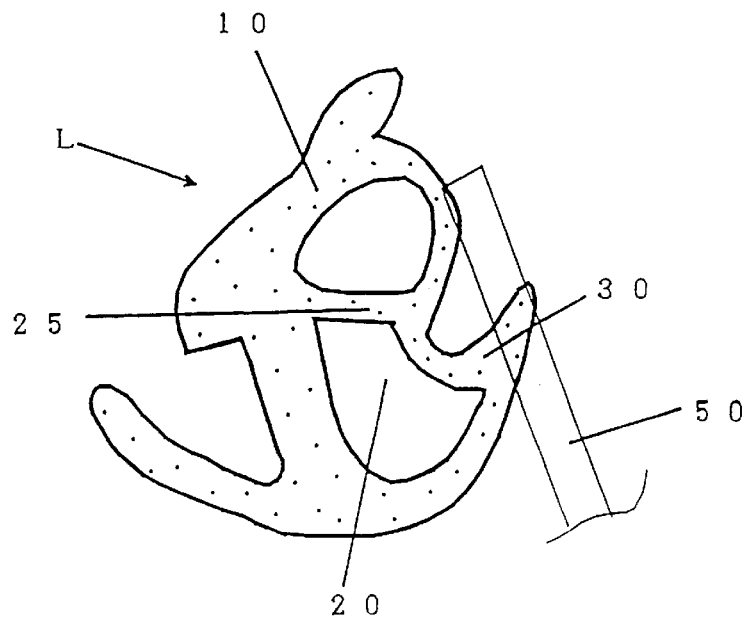
FIG. 7 is a cross-sectional view of an extrusion portion of the second prior art weather strip.
Figure 8:
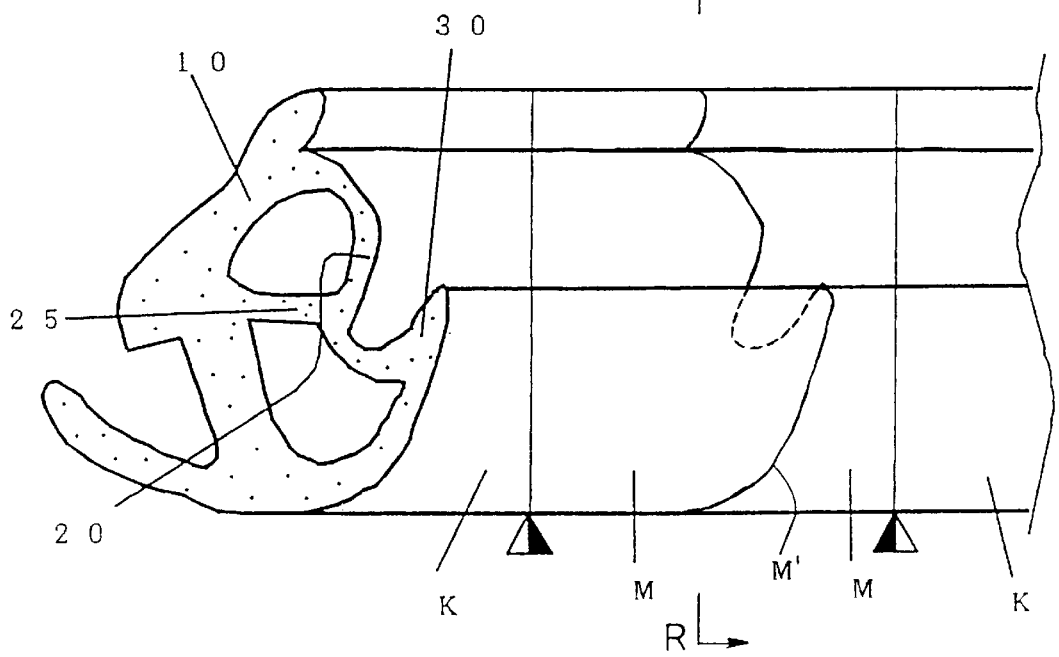
FIG. 8 is a perspective view showing engaging portions of the second prior art weather strip.
Figure 9:
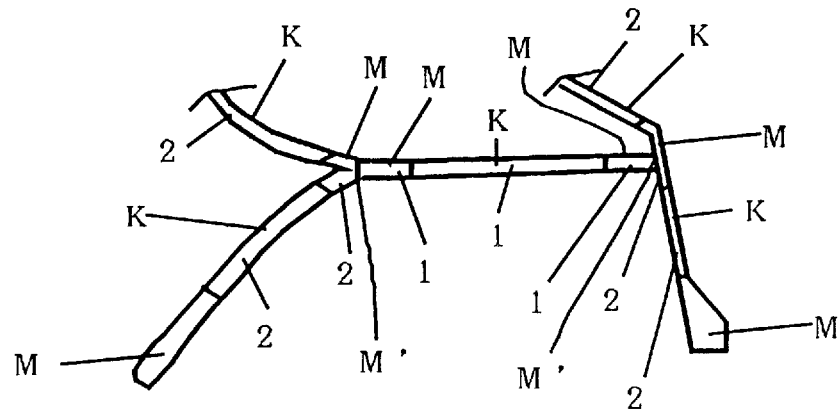
FIG. 9 is a perspective view of a weather strip for a targa top car according to a third prior art weather strip.
Figure 10:
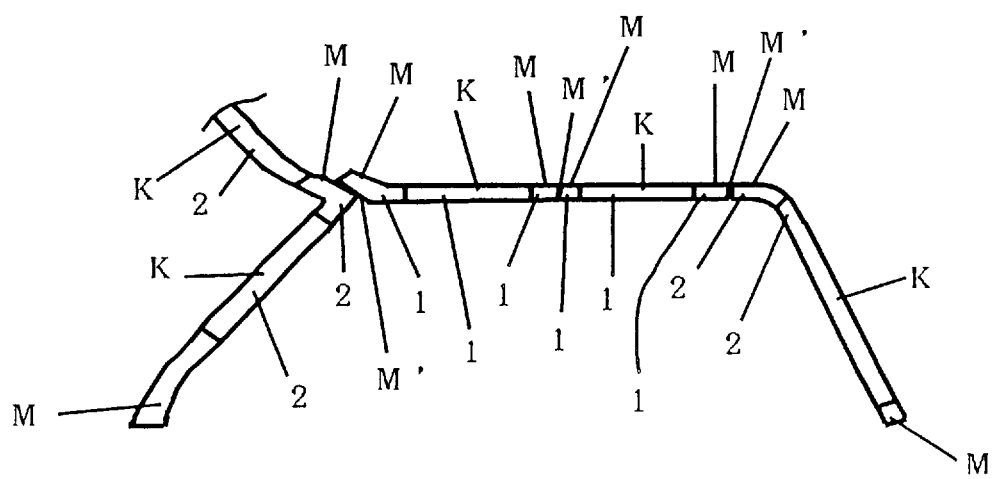
FIG. 10 is a perspective view of a weather strip for a convertible car according to the third prior art weather strip.
Figure 11:
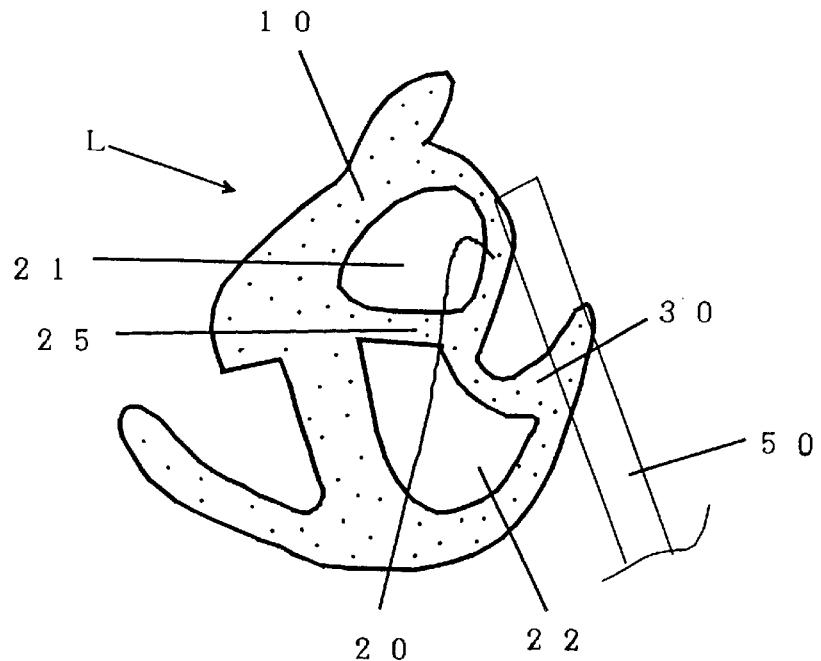
FIG. 11 is a cross-sectional view of an extrusion portion of the third prior art weather strip.
Figure 12:
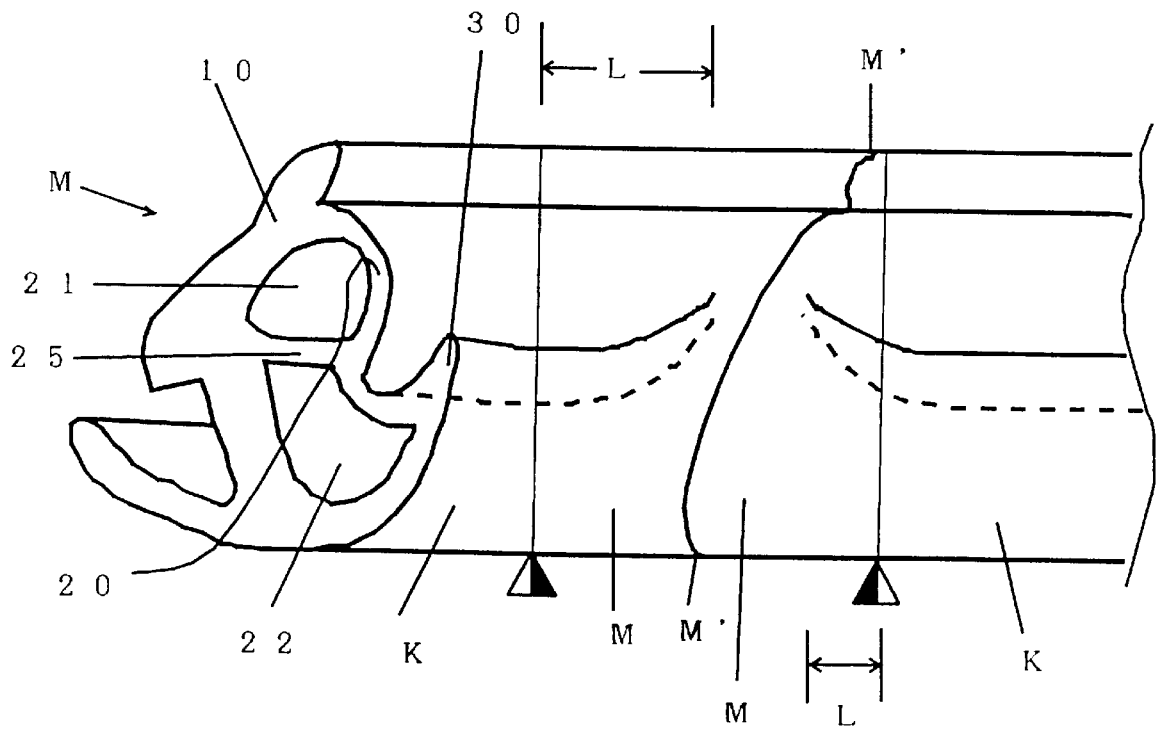
FIG. 12 is a perspective view showing engaging portions of the third prior art weather strip.
Figure 13:
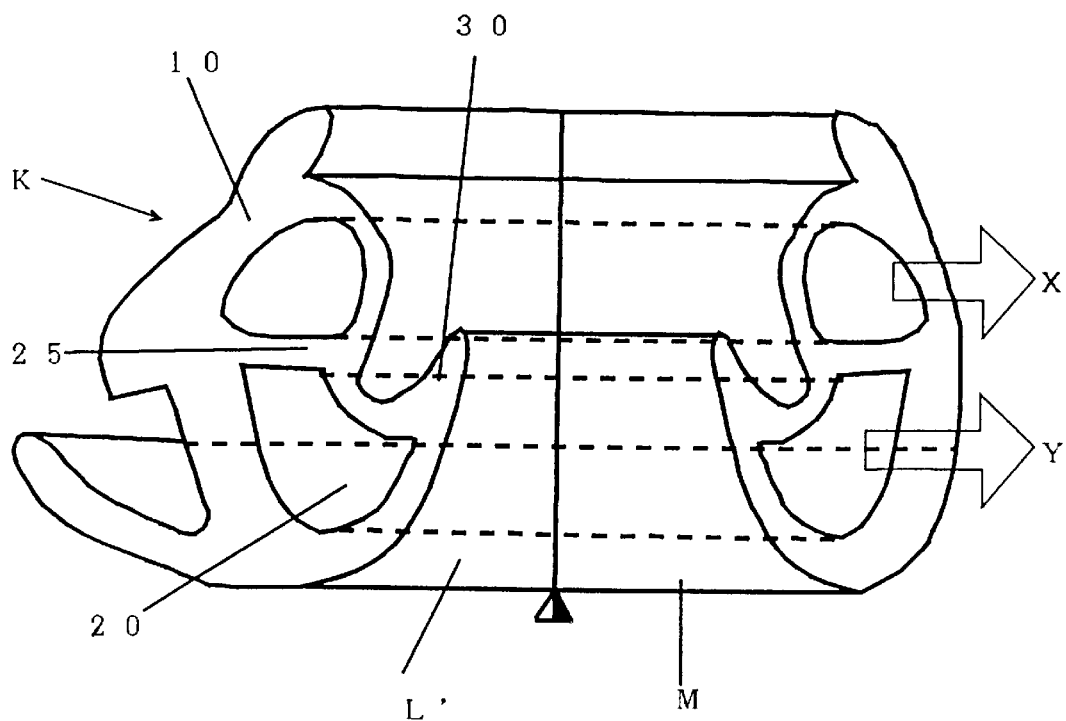
FIG. 13 is a perspective view showing a connecting portion between an extrusion portion and a mold portion denoted at circles A in FIGS. 1 and 2 according to the first embodiment of the present invention.
Figure 14:
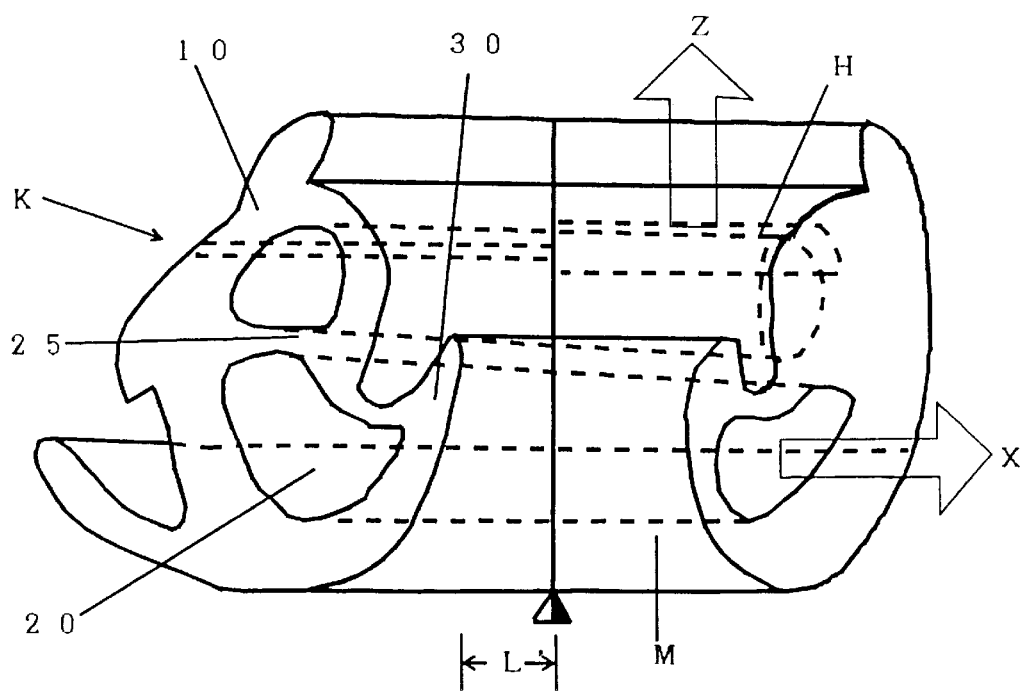
FIG. 14 is a perspective view showing a connecting portion between the extrusion portion and a mold portion denoted at circles A in FIGS. 1 and 2 according to the first embodiment of the present invention.

First Embodiment (FIGS. 13 and 14)

A weather strip according to a first embodiment will be described with reference to FIGS. 13 and 14.

A weather strip is attached to sides of a foldable roof of a vehicle or a detachable roof of a vehicle, or a movable roof of a vehicle, wherein the weather strip elastically contacts a door glass 50 in two stages, i.e., an upper and lower portions thereof.

That is, denoted at 10 is a base 10, and at 20 is a hollow seal integrated with the base 10. The hollow seal 20 has an upper portion directing toward an outside of a vehicle so as to form a convex portion for contacting an upper portion of a door glass 50. A bridge portion 25 is provided in said hollow seal 20 by halving hollow portion of said hollow seal 20 vertically, said bridge portion 25 being constricted at an inner intermediate portion thereof and directed inward and outward of the vehicle. Denoted at 30 is a seal lip projecting from a lower portion of the hollow seal 20 for elastically contacting the door glass 50. A draining function is provided between the hollow seal 20 and the seal lip 30. The aforementioned structure is included in a linear extrusion portion K, a mold portion M and a transfer portion L. Accordingly, it is needless to say that the bridge portion 25 and the seal lip 30 are provided on the mold portion M connecting to the extrusion portion K. Further, cores inserted in the vertically divided upper and lower hollow portions of the hollow seal 20 can be ejected from both side portions of said upper and lower hollow portions of the hollow seal 20 as shown in arrows X and Y in FIG. 13, or the core can be ejected from a core ejecting hole H provided in the base 10, and the core inserted into said lower hollow portion of said hollow seal 20 can be ejected from a side portion of the lower hollow portion of the hollow seal 20 as shown in arrows Z and X in FIG. 14.

Since the structures of the transfer portion L and the mold portion M are the same as the structure of the extrusion portion K, sealing property and the entire external appearance of the transfer portion L and the mold portion M relative to the door glass 50 causing previous problems are respectively improved. Further, the problem involved in ejecting cores is solved without causing any trouble by ejecting the cores from both sides of the upper and lower hollow portions of the hollow seal or by ejecting the core inserted into the upper hollow portion from the core ejecting hole H defined in the base 10 and ejecting the core inserted into the lower hollow portion from the side of the lower hollow portion.

As mentioned above in detail, it is possible to improve the sealing property and an external appearance of the weather strip without involving increase of cost and the cores can be easily ejected.

Figure 15:
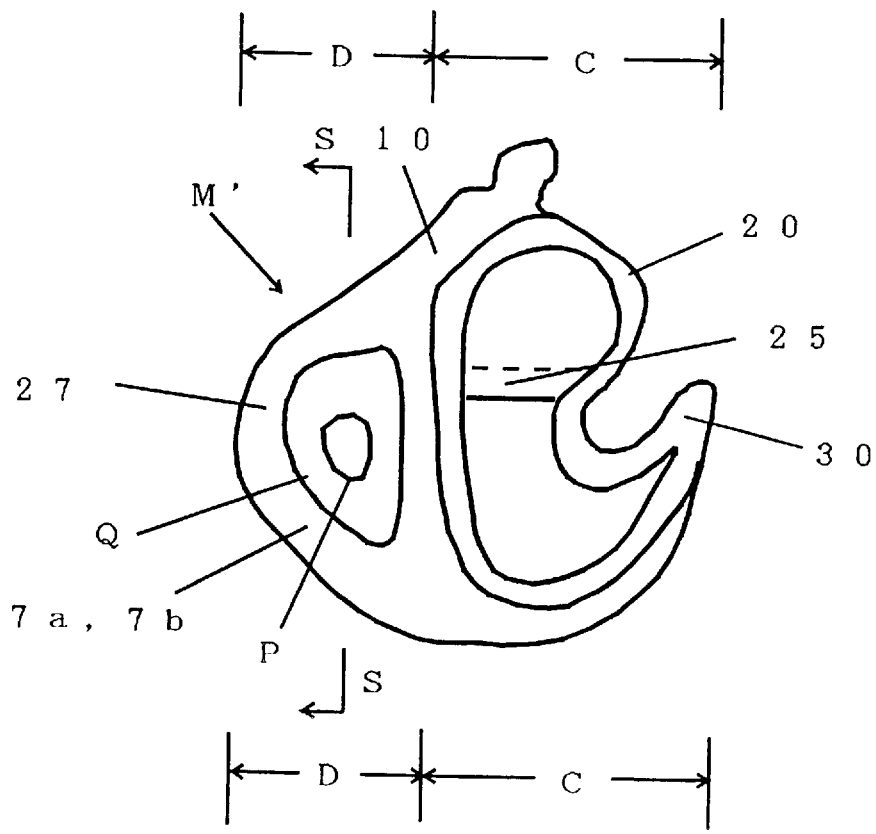
FIG. 15 is a view of a weather strip according to a second embodiment of the present invention as viewed from line R—R of FIG. 8.
Figure 16:
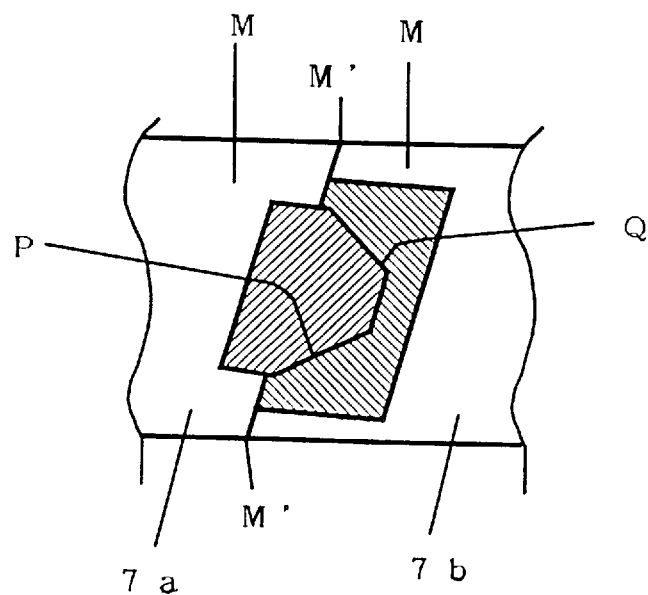
FIG. 16 is a cross-sectional view taken along line S—S of FIG. 15.
Figure 17:
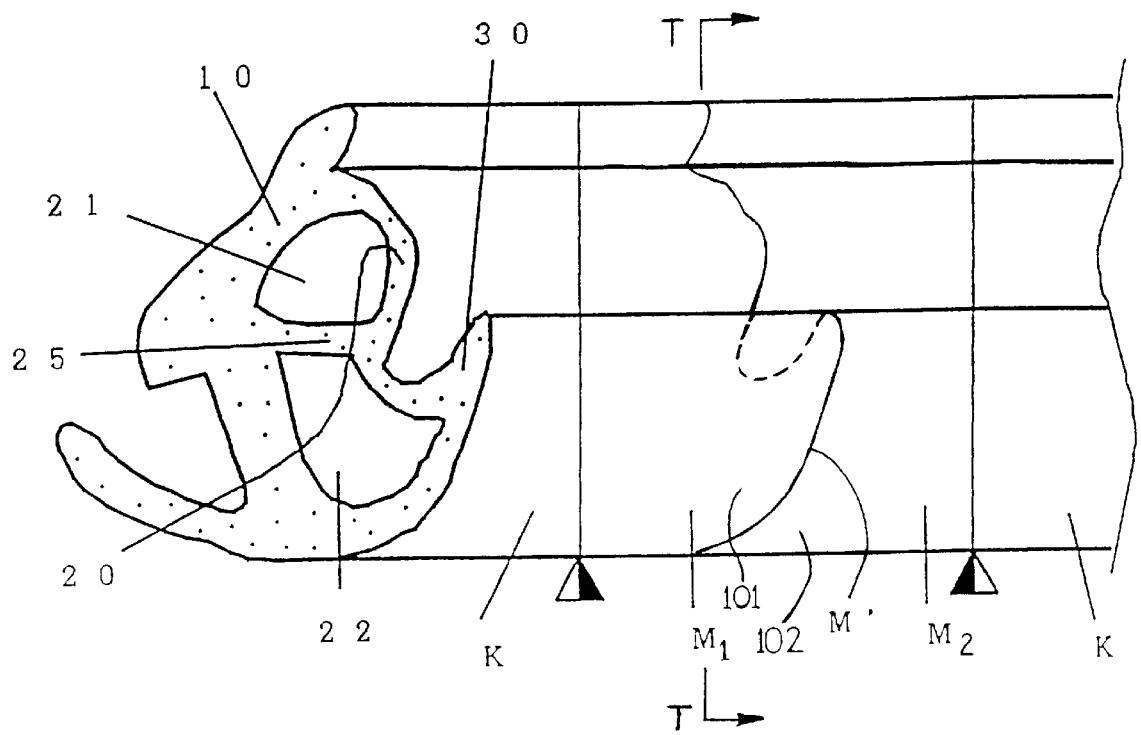
FIG. 17 is a perspective view showing engaging portions of a weather strip according to a third embodiment of the present invention.

Second Embodiment (FIGS. 15 and 16)

A weather strip according to a second embodiment will be described with reference to FIGS. 15 and 16.

The weather strip is attached to sides of a foldable roof of the vehicle or a detachable roof of the vehicle, or a movable roof of the vehicle, wherein the weather strip elastically contacts the door glass 50 in two stages, i.e., an upper and lower portions thereof.

The weather strip comprises a base 10, a hollow seal 20 integrated with the base 10 wherein the hollow seal 20 has an upper portion directing toward an outside of a vehicle so as to form a convex portion for contacting an upper portion of a door glass 50, a bridge portion 25 provided in the hollow seal 20 by halving hollow portion of the hollow seal 20 vertically wherein the bridge portion 25 is constricted at an inner intermediate portion thereof and directed inward and outward of the vehicle, and a seal lip 30 projecting from a lower portion of the hollow seal 20 for elastically contacting the door glass 50, wherein the seal lip 30 directs outward of the vehicle. First and second confronted surfaces 7a and 7b of engaging portions M' and M' have a seal portion denoted at a region C—C and a nonseal portion 27 denoted at a region D—D in FIG. 15. The non-seal portion 27 has a tapered convex portion P formed at one side of a substantially central portion thereof, and a tapered concave portion Q formed at the other side of the substantially central portion thereof, wherein the tapered convex and concave portions P and Q are made of hard synthetic resin or hard solid rubber, and the tapered convex portion P engages with the tapered concave portion Q.

The tapered concave and concave portions P and Q can be formed individually and embedded in the mold portion M as shown in FIG. 16.

Since the first and second confronted surfaces 7a and 7b of the engaging portions M' and M' having the tapered convex and concave portions P and Q respectively made of hard synthetic resin or hard solid rubber are formed at substantially central portions of the non-seal portion at the inside of the car, they can function respectively as guides, and absorb sufficiently uneven fitting even if there is uneven fitting in the weather strip. Further, since the hollow seal 20 and the seal lip 30 are kept to be flexible, they are excellent in fitting property, namely, they can easily fit to the door glass 50, and also they watertightly elastically contact the door glass 50, thereby maintaining an excellent sealing property and sound insulation property.

Further, with the arrangement of the second embodiment, even if there is uneven fitting in the weather strip, such uneven fitting can be sufficiently absorbed, so as to maintain an excellent sealing property and sound insulation property.

Third Embodiment (FIGS. 17 to 21)

A weather strip according to a third embodiment will be described with reference to FIGS. 17 to 21.

The weather strip is attached to sides of a foldable roof of the vehicle or a detachable roof of the vehicle, or a movable roof of the vehicle, wherein the weather strip elastically contacts the door glass 50 in two stages, i.e., an upper and lower portions thereof.

The weather strip comprises a base 10; a hollow seal 20 integrated with the base 10, wherein the hollow seal 20 has an upper portion directed toward an outside of a vehicle so as to form a convex portion for contacting an upper portion of a door glass 50; a bridge portion 25 provided in the hollow seal 20 halving hollow portion of the hollow seal 20 vertically, wherein the bridge portion 25 is constricted at an inner intermediate portion thereof and directed inward and outward of the vehicle; and a seal lip 30 projecting from a lower portion of the hollow seal 20 for elastically contacting the door glass 50, wherein the seal lip 30 directs outward of the vehicle. The above structure is included in an extrusion portion K and mold portions $M_1$, $M_2$. Further, one of the mold portions $M_1$ is detachable or movable and is guided in a detachable direction or moving direction. Still further, both mold portions $M_1$, $M_2$ have engaging portions 101, 102 which are engaged with and complement with each other at contacting end surfaces thereof when one mold portion is mounted on another mold portions M, and the engaging portions have saw-toothed convex and concave portion M so as to maintain effective sealing repulsive force.

Figure 18:
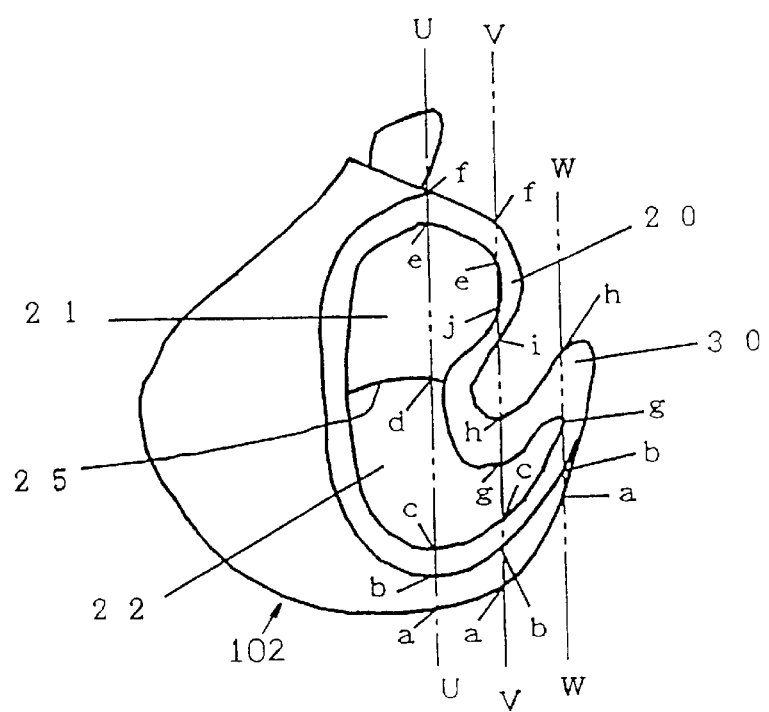
FIG. 18 is a view as viewed from line T—T of FIG. 17.
Figure 19:
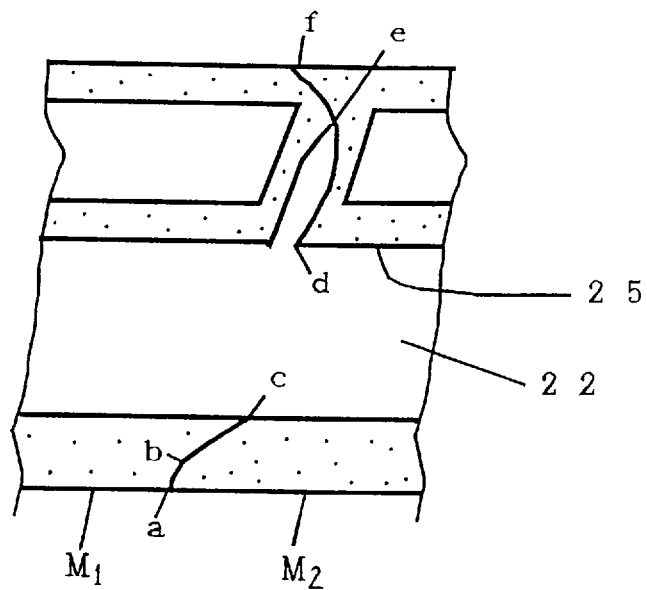
FIG. 19 is a cross-sectional view taken along line U—U of FIG. 18.
Figure 20:
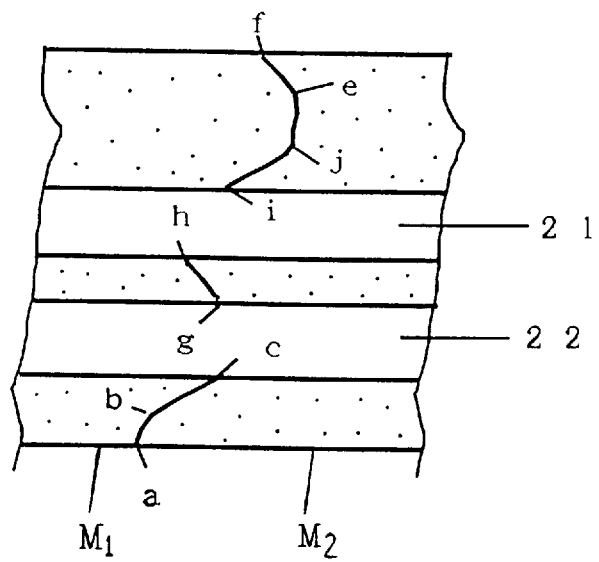
FIG. 20 is a cross-sectional view taken along line V—V of FIG. 18.
Figure 21:
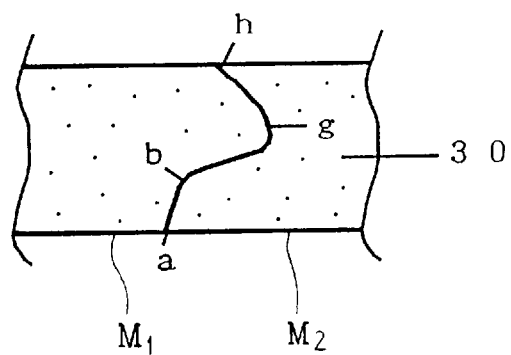
FIG. 21 is a cross-sectional view taken along line W—W of FIG. 18.

The following elements constitute the engaging portions 101, 102 and the engaging portions are staggered as shown in FIGS. 18 to 21. That is, a lower surface a in FIG. 18 is shown in FIGS. 19 to 20. A lower thick central portion b of the hollow seal 20 is shown in FIGS. 19 to 21. A lower inner surface c of the hollow seal 20 is shown in FIGS. 19 and 20. A lower end d of the bridge portion 25 is shown in FIG. 19. An upper thick central portion e of the hollow seal 20 is shown in FIGS. 19 and 20. An upper surface f of the hollow seal 20 as shown in FIGS. 19 and 20. Drain upper portions j and i of the hollow seal 20 are shown in FIG. 20. Thick inner and outer portion g and h of the seal lip 30 are shown in FIG. 20.

Since the structure of the mold portions $M_1$, $M_2$ are the same as the structure of the extrusion portions K, the conventional mold portion M causing previous problems can be double sealed like the extrusion portion K and can obtain draining function. Further, the external appearance of the mold portions $M_1$, $M_2$ can be made the same as that of the extrusion portion K so as to improve the sealing property and the external appearance. Even if there is uneven fitting in the weather strip, such uneven fitting can be sufficiently absorbed so that one of the mold portions $M_1$, $M_2$ is detachable or movable and can be guided in a detachable direction or moving direction, and the mold portions $M_1$, $M_2$ have engaging portions which are engaged with and complement with each other at contacting end surfaces thereof when mounted on another mold portions M so as to maintain effective sealing repulsive force.

Further, with the arrangement of the embodiment, it is possible to improve the sealing property and external appearance relative to the door glass 50 without involving increase of cost. Still further, even if there is uneven fitting in the weather strip, such uneven fitting can be sufficiently absorbed, so as to maintain an excellent sealing property and sound insulation property.

What is claimed is:

1. A weather strip to be attached to sides of a movable roof of a vehicle, said weather strip composed of mold portions having end surfaces brought into contact with each other, and an extrusion portion, said extrusion portion comprising:

a base;

a hollow seal integrated with said base, said hollow seal having an upper portion directing toward an outside of a vehicle so as to form a convex portion;

a bridge portion provided in said hollow seal for vertically halving a hollow portion of said hollow seal, said bridge portion being constricted at an inner intermediate portion thereof and directed inward and outward of said vehicle;

a seal lip projecting from a lower portion of said hollow seal for elastically contacting a door glass;

said mold portions having a second bridge portion and a second seal lip which are the same as those of said extrusion portion; and wherein, said mold portions have engaging portions which are engaged with and complement with each other at the contacting end surfaces thereof when mounted on other mold portions, and wherein said engaging portions have saw-toothed convex and concave portions so as to maintain an effective sealing repulsive force.

2. A weatherstrip for a vehicle, comprising:

an elongate extrusion portion providing a weather seal substantially around a roof of the vehicle and having two ends, and first and second mold portions respectively joined to said two ends of said extrusion portion, said first and second mold portions respectively having first and second engagement means for joining said first and second mold portions to an adjacent mold portion, said first engagement means having a saw-toothed configuration on a surface of said first mold portion for contacting against the adjacent mold portion to maintain a sealing force between said first mold portion and the adjacent mold portion, said second engagement means having a saw-toothed configuration on a surface of said second mold portion for contacting against the adjacent mold portion to maintain a sealing force between said second mold portion and the adjacent mold portion.

3. The weatherstrip according to claim 2, wherein said first and second engagement means are joined together such that said first and second mold portions are sealingly joined together.

4. The weatherstrip according to claim 3, wherein said first and second engagement means respectively include first and second staggered surfaces for contacting the adjacent mold portion, said first and second staggered surfaces providing an engagement force joining said first and second mold portions.

* * * * *